United States Patent [19]
Merle et al.

[11] Patent Number: 5,499,436
[45] Date of Patent: Mar. 19, 1996

[54] TOOL FOR FILMSTRIP ATTACHMENT OR DETACHMENT

[75] Inventors: Thomas C. Merle; Dale W. Ryan; David L. Rowden, all of Rochester, N.Y.

[73] Assignee: Eastman Kodak Company, Rochester, N.Y.

[21] Appl. No.: 172,006

[22] Filed: Dec. 22, 1993

[51] Int. Cl.⁶ .......................... G03B 17/26; B25B 27/00
[52] U.S. Cl. ...................... 29/270; 242/332.8; 242/532.6
[58] Field of Search .............................. 242/532.6, 332.8, 242/332.7, 584.1; 29/270, 430, 806, 417, 809

[56]  References Cited

U.S. PATENT DOCUMENTS 3,586,258  6/1971  Horlezeder .
3,910,516  10/1975  Hoffacker et al. .
3,994,058  11/1976  Sasaki et al. .
5,031,852  7/1991  Dowling et al. .
5,093,686  3/1992  Shigaki .
5,165,619  11/1992  Tasaka et al. .
5,215,273  6/1993  Greene .

FOREIGN PATENT DOCUMENTS

0582852A1  7/1993  European Pat. Off. .

*Primary Examiner*—Robert C. Watson
*Attorney, Agent, or Firm*—Frank Pincelli

[57]  ABSTRACT

A tool for attaching or detaching a filmstrip to a cartridge. The tool includes a blade and a base section having an upper end and a lower end. The blade is integrally secured to the upper end of the base section. The tool is made by first providing the blade with a predetermined configuration and placing the blade in a mold and introducing a resin material so as to form the base section of the tool and integrally securing the section to the base section.

8 Claims, 6 Drawing Sheets

TOOL FOR FILMSTRIP ATTACHMENT OR DETACHMENT

CROSS REFERENCE TO RELATED APPLICATIONS

Reference is made to commonly assigned copending application Ser. No. 5,439,186 entitled "Method and Apparatus For Attaching or Detaching a Filmstrip to a Film Cartridge", by Thomas C. Merle and Dale W. Ryan; and Ser. No. 08/098,112 entitled "A Tool and Method For Detaching a Trailing End Portion of a Filmstrip From at Least One Hook Atop a Ramp on a Film Spool Inside a Film Cartridge", by Thomas C. Merle, Dale W. Ryan and David L. Rowden, all of which are hereby incorporated by reference.

FIELD OF THE INVENTION

The present invention is directed to tool and method for attaching or detaching a filmstrip to a film cartridge.

BACKGROUND OF THE INVENTION

Current techniques for allowing attachment of a filmstrip to a cartridge require pre-positioning of a cartridge in a predetermined orientation before attachment of the filmstrip occurs. A tool is used for engaging the filmstrip with the spool within the cartridge. This method requires that the features of the cartridge assembly and the tool used to attach filmstrip be accurately dimensioned and precisely controlled to allow repeatability. One method of attaching a filmstrip to a cartridge is described in copending application Attorney Docket 68,280 referred to above. This application discloses the use of a tool having a base section having one end pivotly mounted to a device that holds the film cartridge, and an acruate blade provided at the other end of the base section. The blade is outside of the cartridge when the tool is in the disengaged position. When it is desired to attach/reattach a filmstrip to the spool, the tool is rotated so that the arcuate blade section is rotated into the cartridge so that the terminal end, which drives the filmstrip, will engage the spool. It is important to assure that the tool properly engage the spool. However, due to the configuration of the tool, the motion of the tool during attachment and the fact that the cartridge is in a fixed position, the dimensional accuracy of the tool becomes quite important. Prior tools, in order to provide a low cost tool, have comprised a separate blade and a generally circular base section wherein the blade is secured to the base by a bolt or other similar fastening means. However, this type construction has been found to be unsuitable for continued repeatable performance as it can not be assured that the terminal end of the blade would properly and consistently engage the spool properly.

Thus, there exist a problem in prior tools in providing a tool that can be economically made in quantity that provides consist and reliable performance in engaging accurately the spool of a film cartridge.

SUMMARY OF THE INVENTION

In accordance with one aspect of the present invention there is provided a tool for attaching or detaching a filmstrip to a cartridge, comprising:

a blade having a terminal end for engaging an end portion of a filmstrip with a spool of a film cartridge;

a base section having an upper end and a lower end, blade being integrally secured to upper end, the lower being designed to be rotatably mounted so as to move the blade in and out of engagement with the spool of the cartridge.

In another of the present invention there is provided a method of making a tool for attaching and/or detaching a filmstrip to the spool of a film cartridge, comprising the steps of:

a. providing a blade of a predetermined configuration and having a terminal end;

b. placing the blade in a mold and introducing a resin material so as to form the base section of the tool and integrally securing the blade to the base section.

In yet another aspect of the present invention there is provided a tool for attaching and/or detaching a filmstrip to a cartridge, comprising:

a blade having a terminal end having a first mounting surface of a first configuration;

a base section having an upper end and a lower end, the upper end of the tool having a second mounting surface of a second configuration, the first and second configurations being substantially identical, the blade and the base section being secured together at their mounting surfaces, the lower being designed to be movably mounted so as to move the blade in and out of engagement with the spool of the cartridge.

Applicants have developed a tool and method of making the tool wherein a tool is provided having a high degree of dimensional accuracy, that is simple in construction, easy to manufacture and provides repeatable and reliable performance.

DETAILED DESCRIPTION OF THE DRAWINGS

FIG. 12 is an exploded view of a modified tool made in accordance to the present invention.

DETAILED DESCRIPTION

The invention is disclosed as being embodied in a filmstrip unwinding and winding apparatus to be used typically with a film cartridge. Certain features of this type cartridge and of the winding and unwinding the apparatus used to insert or remove the filmstrip is generally known, the description which follows is directed to, in particular, elements forming a part of, or cooperating directly with the disclosed embodiment. It is to be understood, however, that other elements, not specifically shown or described, may take various forms known to persons of ordinary skill in the art.

Figure 9:
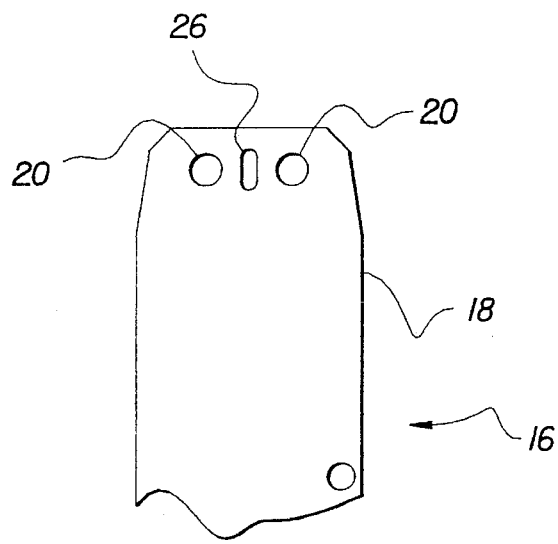
FIG. 9 is a top plan view of the end of the filmstrip which engages the spool.

Referring now to FIGS. 1–7, there is illustrated a portion of an apparatus 8 made in accordance with the present invention for removing or inserting a filmstrip 16 into or from a film cartridge 10. The film cartridge 10 comprises a cartridge shell 12 and a spool 14 rotatably mounted to the shell 12. In the particular embodiment illustrated, the cartridge 10 is designed to hold 24 mm size filmstrip, however, the cartridge 10 may be designed to contain any size film. The spool 14 is rotatable about an axis X in filmstrip winding and unwinding directions U and W inside the cassette shell 12. Thus, in the embodiment illustrated the cartridge 10 is of the thrust type. U.S. Pat. Nos. 5,031,852 and 5,215,273 disclose film cartridges/cassettes of the thrust type which are hereby incorporated by reference. The cartridge shell 12 consists of two shell halves 13,15 which are secured together by known means. A roll of filmstrip 16 is coiled about the spool 14 to form successive convolutions of the filmstrip 16. The filmstrip 16 includes an inner or trailing end portion 18 (see FIG. 9) which is detachably secured to the spool 14 (see FIGS. 10 & 11). In the particular embodiment illustrated, the trailing end portion 18 is provided with a pair of openings 20 which are designed to engage a pair of projections 22 formed in the hub 24 of the spool 14. The trailing end portion 18 is further provided with a drive opening 26 which, in the particular embodiment illustrated, is designed to engage an attachment tool 66 so that the trailing end portion 18 can be guided into the cartridge for attaching the filmstrip 16 to the spool 14 as is later discussed herein in detail.

The cartridge 10 is provided with a opening/slot 28 for allowing a filmstrip 16 to go in to or out of the cartridge. In the particular embodiment illustrated, the opening 28 has a substantially rectangular configuration having a top edge 32 and a bottom edge 34 which are substantially coplanar to the top and bottom surface of the filmstrip 16 and a pair of oppositely disposed side edges 36,38. The particular height H and width W of the opening 28 is selected in accordance with the needs of the cartridge and filmstrip. In the particular embodiment illustrated, the opening 28 has a height of about 0.12 inches (0.30 cms) and a width of about 1.12 inches (2.84 cms).

Figure 2:
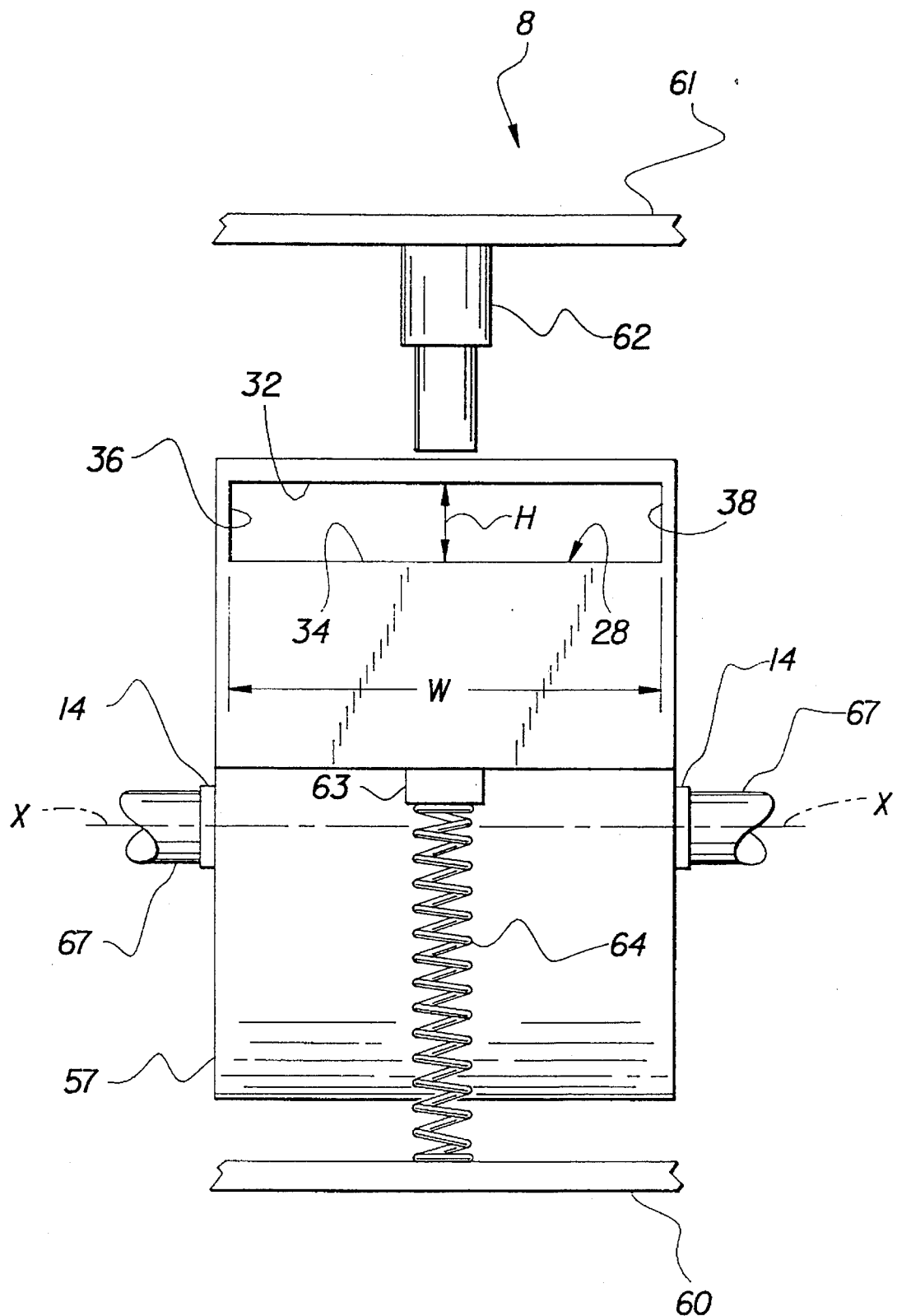
FIG. 2 is a front elevational view of the mechanism of FIG. 1 taken along line 2—2.
Figure 3:
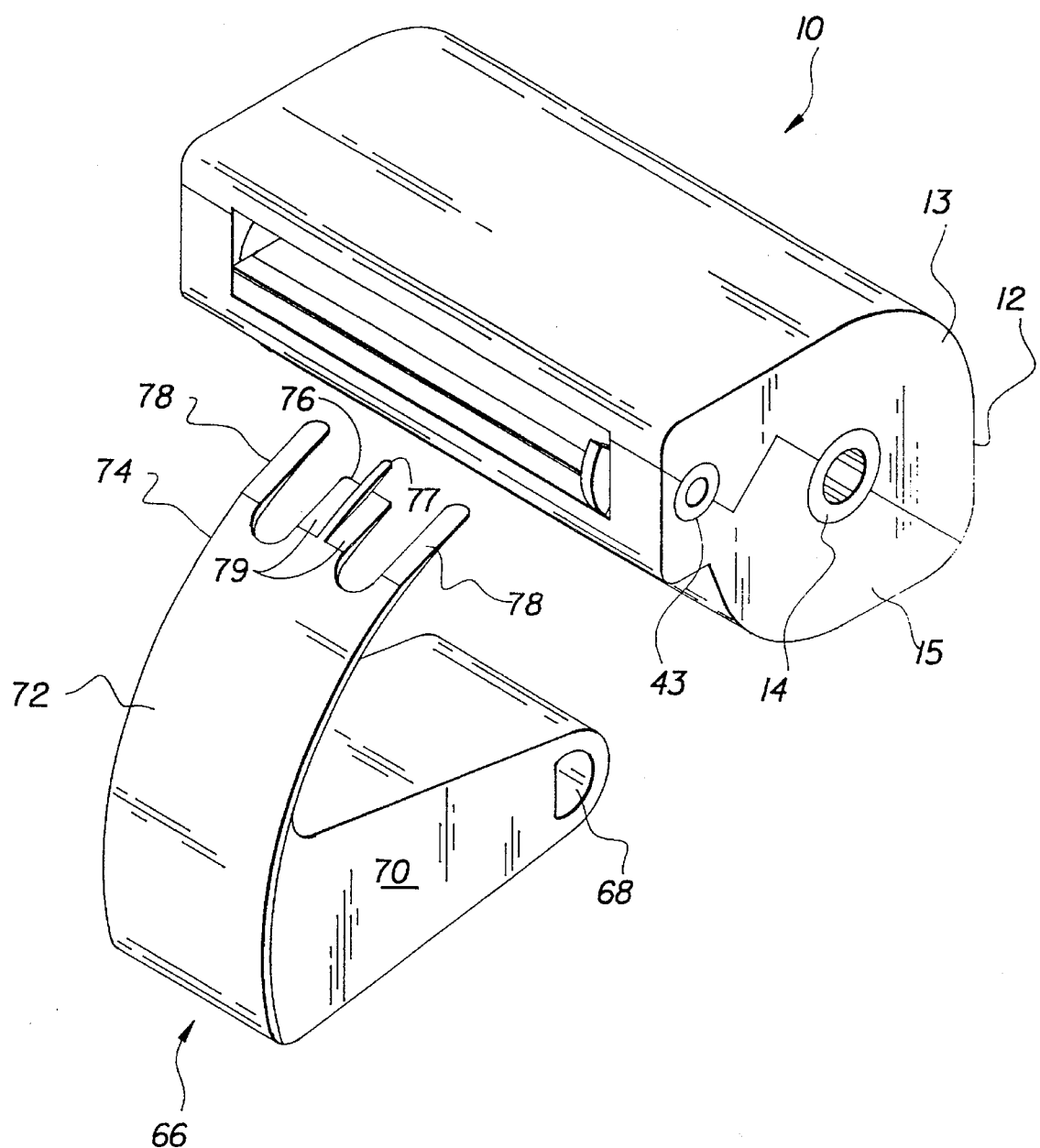
FIG. 3 is a perspective view of the cartridge of FIG. 1 and the attachment tool used to re-engage the filmstrip to the cartridge.

A light valve/door 40 is provided which extends across the opening 28. The light valve 40, when in the closed position, prevents ambient light from entering the cartridge 10 through the opening 28, and when in the open position, allows filmstrip 16 to either be inserted or removed from the cartridge 10. In the particular embodiment illustrated, the light valve 40 comprises a rotatable shaft 42 having a pair of ends rotatably mounted to the side walls 44 of the shell 12. The shaft 42 includes a ledge section 45 configured such that when in the closed position, the ledge section 45 will abut against stop 48 provided on the interior of the shell adjacent the opening 28. A projection 50 is provided below the bottom edge 34 to assist in preventing any ambient light from passing into the cartridge. The shaft 42 and ledge section 45 are configured such that when the light valve 40 is in the open position, as illustrated in FIGS. 2 and 3, sufficient clearance is provided for allowing egress or ingress of the filmstrip 16. At least one end 43 of the shaft 42 extends through the shell halves 13,15 so that a drive tool can engage the end 43 for moving the light valve 40 between the open and closed positions. It is to be understood that the present invention is not limited to the particular light valve 40 disclosed and that various other light valves may be used.

Figure 10:
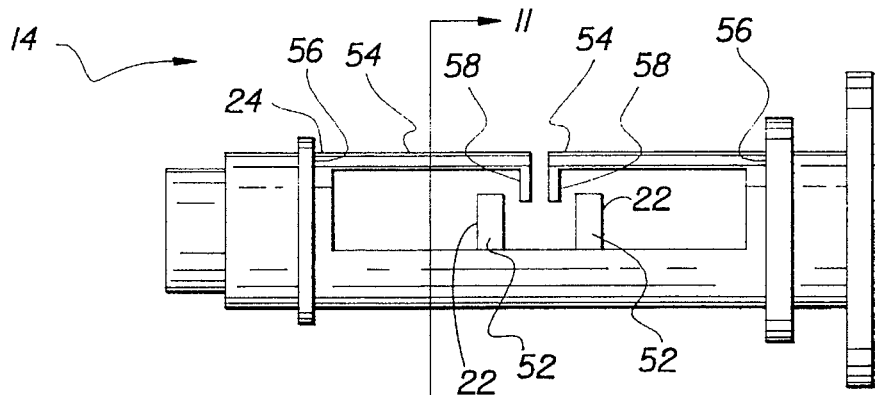
FIG. 10 is a elevational view of the spool of the cartridge of FIG. 1.
Figure 11:
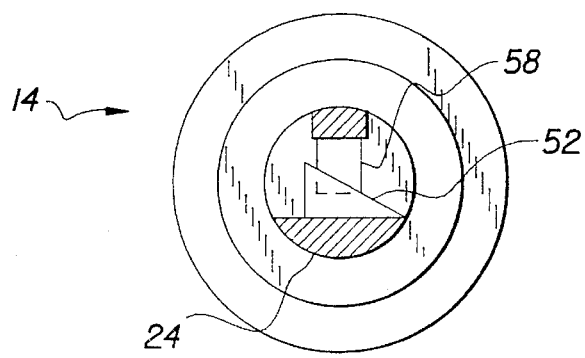
FIG. 11 is a cross-sectional view of the spool of FIG. 10 as taken along line 11—11.

Referring to FIGS. 10 and 11, there is illustrated an enlarged view of the spool 14. The spool 14 includes a pair of spaced projections 22 disposed in the central area of the hub 24 which are positioned so as to engage openings 20 in the trailing end 18 of the filmstrip 16. Preferably, as illustrated, projections 22 are provided with an inclined surface 52 which assist in the reattachment of the filmstrip as discussed later herein. The spool 14 is also provided with a pair of flexible retaining members 54 which extend from each of the lateral ends 56 of spool 14 and terminate in a pair of downwardly extending contact members 58. The flexible members 54 assist in retaining the trailing end 18 of the filmstrip 16 on the spool 14 once projections 22 have engaged openings 20.

Figure 1:
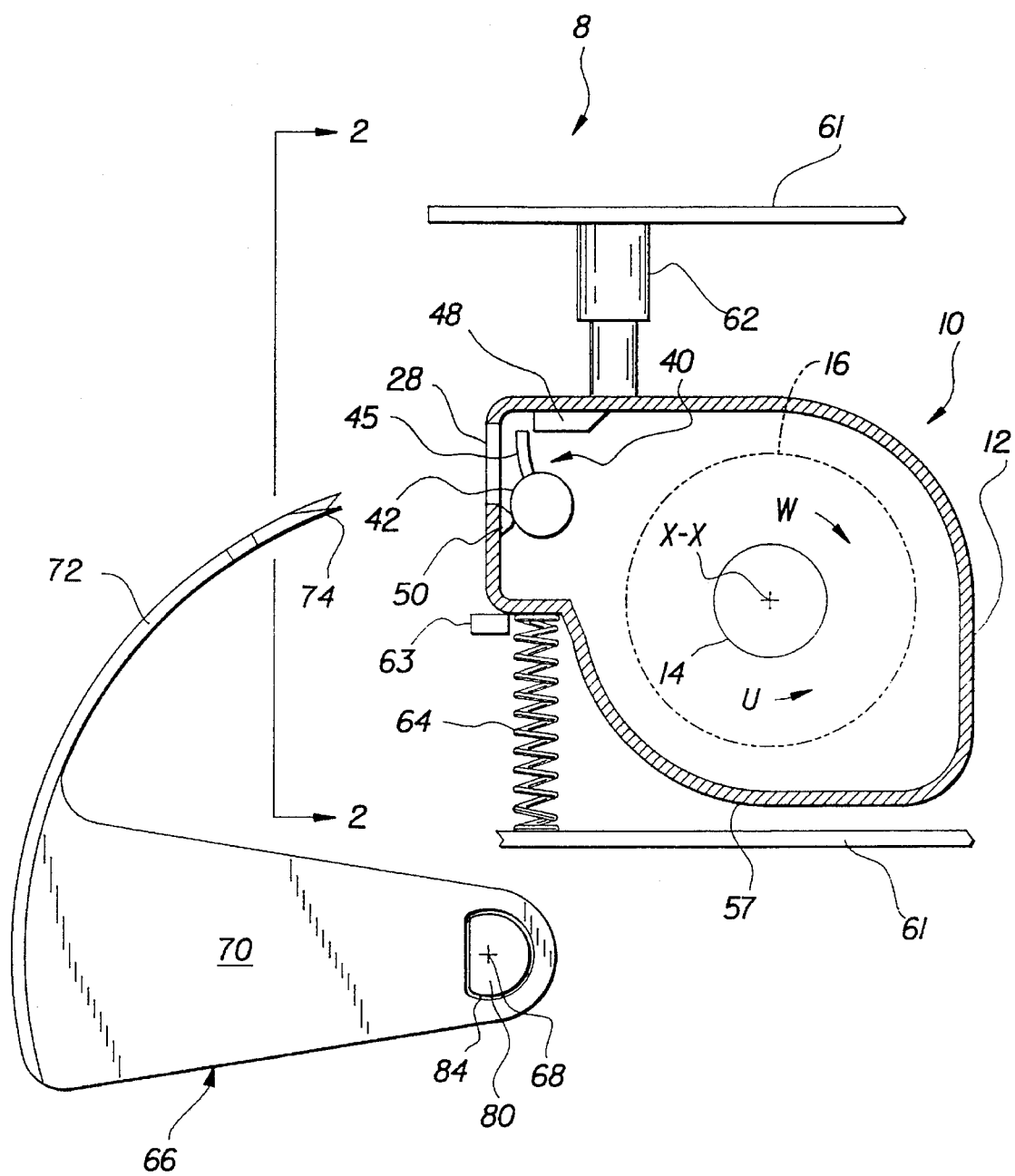
FIG. 1 is a cross-sectional view of a mechanism used to retain a film cartridge in position and for reattach and positioning of the reattachment tool for allowing reattachment to the film cartridge.

As can be seen from FIGS. 1–7, a first mechanism 60 is provided for orienting the cartridge 10 in the first engaged position. The mechanism includes a frame 61 and a hold down pin 62 secured to frame 61. The pin 62 may be moved between a first engaged position as shown in FIGS. 1 and 2 and the non-engaged position as illustrated in FIGS. 3–6. The pin 62 may be moved between these two positions by a desired technique. In the embodiment illustrated, pin 62 is moved by a solenoid. When the pin 62 is in the first engaged position, the pin 62 presses against a portion of the cartridge 10 so that the cartridge 10 is pushed against a second biasing member 64 so as to position the cartridge 10 in first orientation as illustrated in FIGS. 1 and 2.

An attachment tool 66 made in accordance to the present invention is mounted to the frame 61 such that it pivots about point 68. The tool 66 includes a mounting section 70 having at its outer end an elongated engagement arcuate blade 72 designed to be placed through opening 28 in cartridge 10. The blade 72 has a terminal end 74 which is used to move and guide the end of the filmstrip 16 into the cartridge 10. In the embodiment illustrated, terminal end 74 comprises a central engaging member 76 designed to engage opening 26 at the end of the filmstrip 16. Member 76 includes a retaining finger 77 which extends above and past a adjacent support surface 79. A pair of outer projecting members 78 are provided for supporting the lateral sides of the filmstrip 16.

Figure 7:
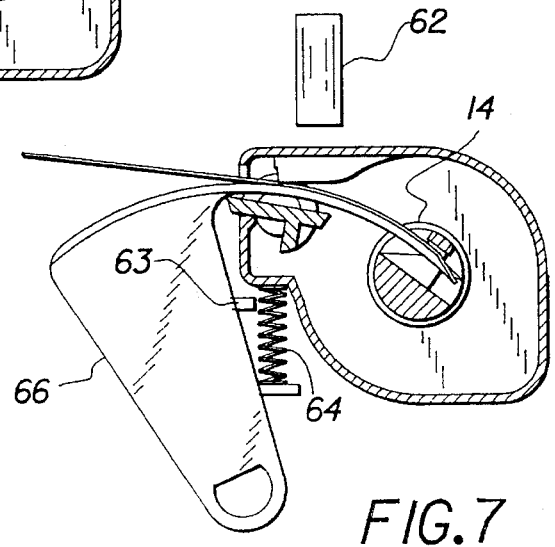
FIG. 7 is a view similar to FIG. 1 illustrating the attachment tool in the second engagement position which allows the filmstrip to be secured to the spool of the cartridge.
Figure 8:
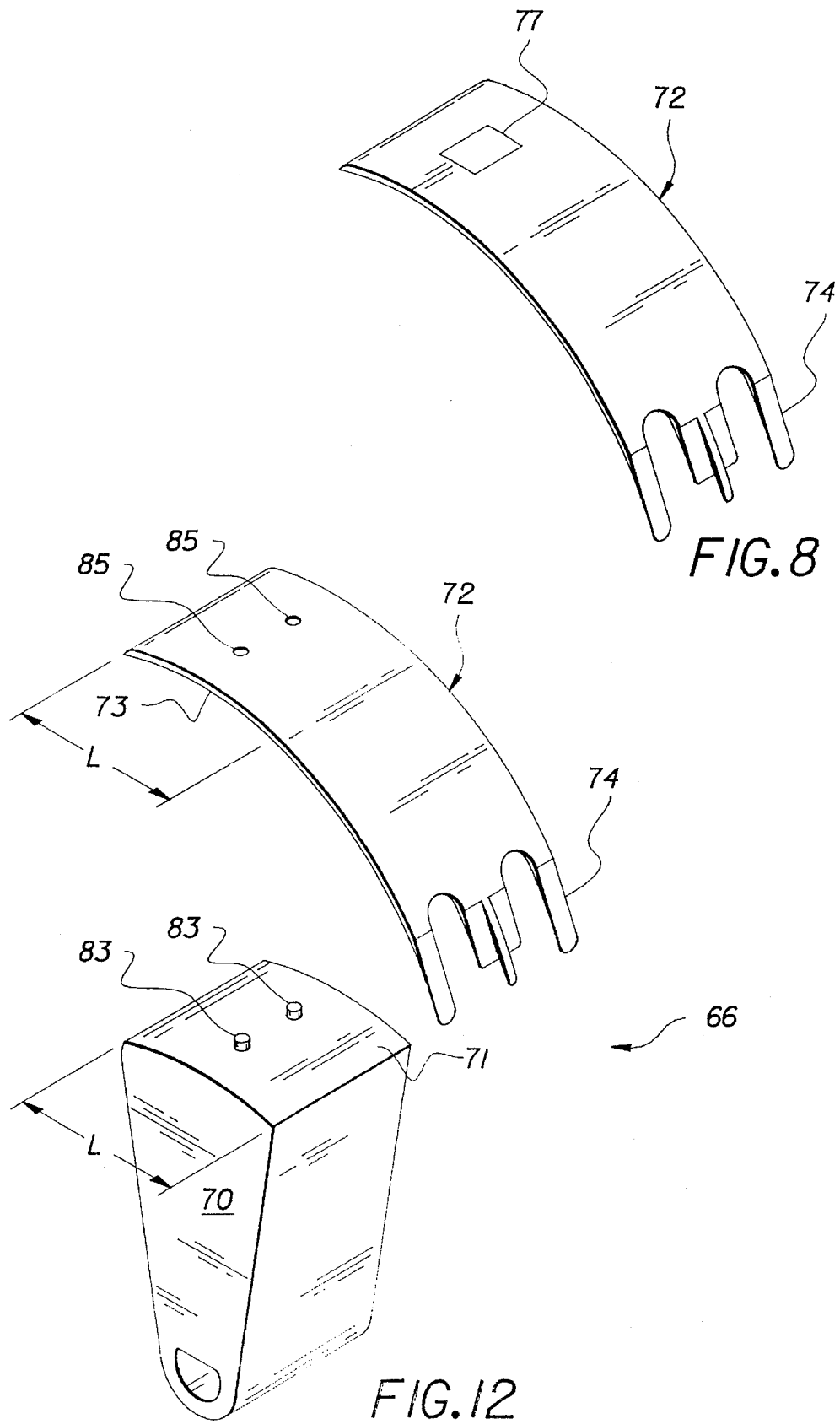
FIG. 8 is perspective view of the blade of the tool of the present invention prior to being secured to the base portion of the tool.

The tool 66 is made so that the desired dimensioned precision is maintained so that the terminal end 74 can properly engage the spool 14. The tool 66 is designed so that the blade 72 is integrally formed as a part of the tool 66. In particular embodiment illustrated in FIGS. 1–8, the blade 72 is formed as a separate piece as is illustrated in FIG. 8. In the preferred embodiment illustrated, the blade 72 is made of metal, for example, stainless steel, and is manufactured in the configuration illustrated. The rear end 75 is preferably provided with an opening 82 which is used to assist in securing the blade 72 to the base section 70. The tool 66 is made by placing the blade 72 into a mold at a fixed location and introducing, for example, an appropriate plastic resin into the mold so as to integrally form the base section directly to the blade 72. The plastic resin fills the opening 82 which assists in providing secure attachment of the blade 72. Applicants have found that polycarbonate is a suitable resin for forming the base section. However, it is to be understood that various other plastic materials may be used to form the base and any other rigid material may be used to form the blade. For example, but not by way of limitation, the blade or base may be made of a rigid ceramic or composite material.

Figure 4:
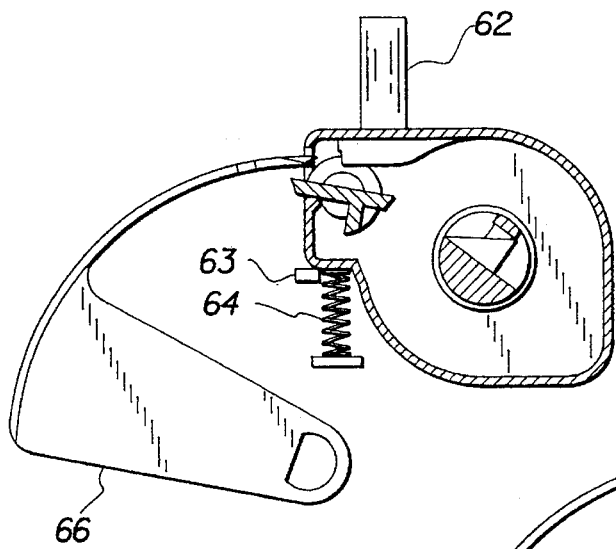
FIG. 4 is a view similar to FIG. 1 illustrating the attachment tool in a first engaged position.
Figure 5:
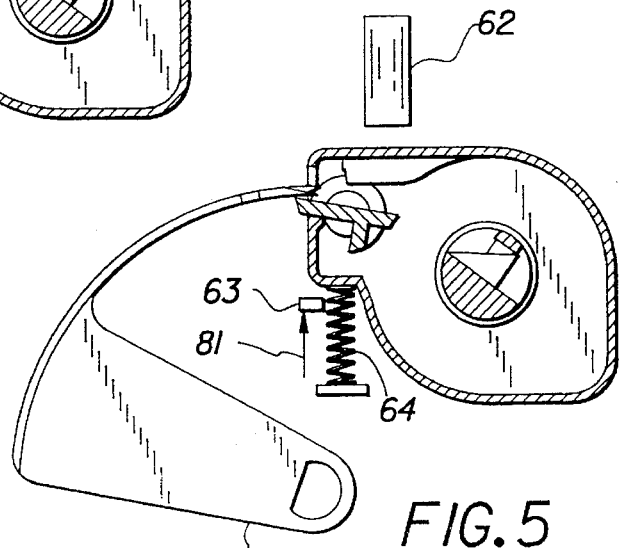
FIG. 5 is a view similar to FIG. 1 illustrating the mechanism used to hold the cartridge in a first orientation in the release position.
Figure 6:
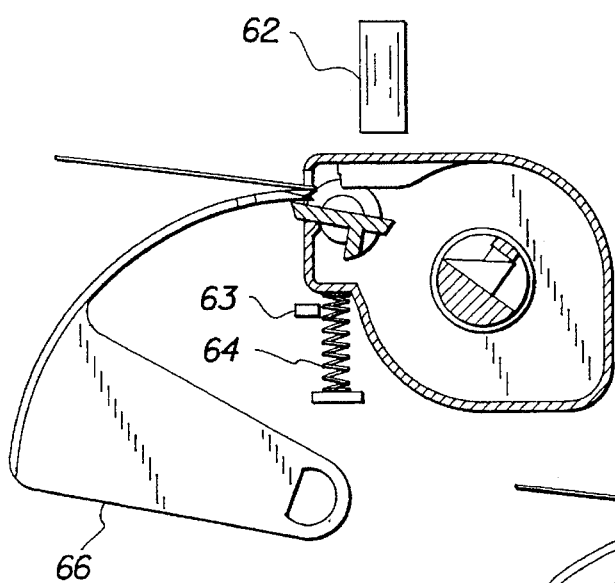
FIG. 6 is a view similar to FIG. 1 wherein the tool restricts further movement of a film cartridge so as to orient it in a second position and where the filmstrip is secured to the attachment tool.

Means are provided for moving the tool 66 from the non-engaged position, as illustrated in FIG. 1, to the first engaged position, as illustrated in FIGS. 2, 3 and 4. In the particular embodiment illustrated, this may be accomplished by providing a drive shaft 80 which is secured to a hole 84 provided in the lower end of the base section 70 of the tool 66. Preferably the hole 84 is formed during molding of the tool 66. The drive shaft 80 is appropriately driven by a motor, not shown, for rotating the tool 66 in position as required. For example, a stepper motor may be used for accurately positioning of the tool 66 in the various positions during operation. However, it is to be understood that any appropriate mechanism may be used for moving of the tool 66 between its non-engaged and engaged positions. The size of the opening 28 of the cartridge 10 is such that the end 74 of blade 72 will easily be guided into this access opening 28 when the tool is positioned in its first engaging position. As best illustrated by reference to FIG. 3, it can be seen that the end 74 is positioned in the area just past the opening 28 so that at least a portion of tool 66 is directly above the bottom edge 34 of the opening 28. Once the tool 16 has been positioned at its first engaging position, pin 62 is disengaged from the cartridge 10. At this point, second biasing means 64 biases the cartridge in a second direction as illustrated by arrow 81. However, the end 74 of tool 66, since it is in the opening 28, will restrict the cartridge 10 from any further rotational movement. Thus, the tool 66 orients the cartridge in a second engaging position. At this point, a filmstrip 16 is introduced so that it engages the end of the tool 66. In particular, the end portion 18 is driven into the cartridge 10 so that the drive opening 26 goes past the engaging member 76 a short distance. Then the filmstrip 16 is driven in the opposite direction until the engaging member 76 engages the drive opening 26. In particular, the retaining finger 77 will pass through opening 26 and the area of the filmstrip surrounding opening 26 will be supported by surface 79 and outer projecting member 78. Thereafter, once the tool 66 has engaged the end portion 18 of the filmstrip 16, the tool 66 is rotated so that the end portion 18 is moved into the cartridge 10 such that it engages the spool 14 as shown in FIG. 7. The tool 66 moves the end portion 18 of the film strip 16 between the retaining members 54 and the hub 24 so as to raise members 54 and allow projections 22 to engage openings 20. Once the filmstrip 16 has been attached to the spool 14, the tool 66 is rotated out of the cartridge 16 to the non-engaged position, as shown in FIG. 1. The spool 14 may then be rotated in the appropriate direction so as to wind of the filmstrip 16 thereon.

While the tool 66 has been described in detail as being used to attach the filmstrip to the spool, a modified tool could be adapted for use in detaching the filmstrip from the spool.

In the particular embodiment illustrated in FIGS. 1–8, the tool is integrally formed by molding the blade as a part of the entire tool. Alternately, the mounting section and blade may each be separately formed, each having a common mating surface where the two parts are secured together by a suitable adhesive or by other securing means. As illustrated in FIG. 12, there is illustrated an exploded view of a modified tool 66 made in accordance with the present invention. The mounting section 70 has a mounting surface 71 which conforms and mates with mounting surface 73 of blade 72. The two parts can then each be independently formed. However, it is important that the surfaces 71, 73 have substantially identical mating configurations for a least a length L sufficient to provide rigidity and stability between the two parts so that the tool 66 when mounted to the apparatus will accurately position the terminal end 74 at the same location. In the particular embodiment illustrated mounting surfaces have a generally arcuate shape having a common radius R. At least one locating projection 83 is provided in the base section 70 for engagement with an locating opening 85 in blade 72 so that proper alignment can be provided between the two parts so that the blade 72 is located in a predetermined position. Alternatively, the projection may be provided in the blade 72 for mating with an opening in the base section 70. In this way the required precision for the placement and location of the terminal end 74 can be maintained.

Thus, the present invention provides a tool and method of making the tool wherein a tool is provided having a high degree of dimensional accuracy, that is simple in construction, easy to manufacture and provides repeatable and reliable performance.

It is to be understood that various other changes or modifications may be made with departing from the scope of the present invention, the present being defined by the claims that follow.

Parts List:
8 . . . apparatus
10 . . . cartridge
12 . . . shell
13,15 . . . shell halves
14 . . . spool
16 . . . filmstrip
18 . . . end portion
20 . . . openings
22 . . . projections
24 . . . hub
26 . . . drive opening
28 . . . opening/slot
32 . . . top edge
34 . . . bottom edge
36,38 . . . side edges
40 . . . light valve/door
42 . . . rotatable shaft
43 . . . end
44 . . . side walls
45 . . . ledge section
48 . . . stop
50 . . . projection
52 . . . inclined surface
54 . . . retaining members
60 . . . first mechanism
61 . . . frame
62 . . . hold down pin
64 . . . second biasing member
66 . . . tool
68 . . . point
70 . . . mounting section
71 . . . mounting surface
72 . . . arcuate blade
73 . . . mounting surface
74 . . . terminal end 75 ... rear end
76 ... central engaging member
77 ... retaining finger
78 ... outer projecting members
79 ... surface
80 ... drive shaft
81 ... arrow
82 ... opening
83 ... projection
84 ... hole
85 ... opening

We claim:

1. An integrally formed tool for attaching and/or detaching a filmstrip to a cartridge, said cartridge having a spool rotatably mounted therein about an axis of rotation and an opening through which said filmstrip may be inserted or removed from said cartridge, said opening having a top edge and a bottom edge, a rotatable light valve is provided adjacent said opening for moving between an opened position and closed position, comprising:

an arcuate metal blade having a terminal end;

a base section made of a plastic material, said base section having an upper end and a lower end, said blade being integrally secured by placing said blade in a mold and providing plastic resin from mold so as to integrally form the base section directly to the upper end of the blade, said lower end being designed to be rotatably mounted so as to move said blade in and out of engagement with the spool of the cartridge.

2. An integrally formed tool according to claim 1 wherein said arcuate blade is made of metal.

3. An integrally formed tool according to claim 1 wherein said blade is made of stainless steel.

4. An integrally formed tool according to claim 2 wherein said plastic material is polycarbonate.

5. An integrally formed tool for attaching and/or detaching a filmstrip to a cartridge, said cartridge having a spool rotatably mounted therein about an axis of rotation and an opening through which said filmstrip may be inserted or removed from said cartridge, said opening having a top edge and a bottom edge, a rotatable light valve is provided adjacent said opening for moving between an opened position and closed position, comprising:

an arcuate metal blade having a terminal end;

a base section made of a plastic material, said base section having an upper end and a lower end, said blade being integrally secured by placing said blade in a mold and providing plastic resin from mold so as to integrally form the base section directly to the upper end of the blade, said lower end being designed to be movably mounted so as to move said blade in and out of engagement with the spool of the cartridge.

6. An integrally formed tool according to claim 5 wherein said blade is made of stainless steel.

7. An integrally formed tool according to claim 5 wherein said plastic material is polycarbonate.

8. An integrally formed tool according to claim 5 wherein said blade has a generally arcuate configuration.

* * * * *